United States Patent
Kawanishi et al.

(10) Patent No.: US 7,711,215 B2
(45) Date of Patent: May 4, 2010

(54) OPTICAL AMPLITUDE MODULATION SYSTEM CAPABLE OF CANCELLING HIGH ORDER COMPONENT

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 307 days.

(21) Appl. No.: 12/065,278

(22) PCT Filed: Aug. 30, 2006

(86) PCT No.: PCT/JP2006/317098

§ 371 (c)(1),
(2), (4) Date: Feb. 28, 2008

(87) PCT Pub. No.: WO2007/026759

PCT Pub. Date: Mar. 8, 2007

(65) Prior Publication Data

US 2009/0238510 A1    Sep. 24, 2009

(30) Foreign Application Priority Data

Aug. 31, 2005   (JP) .............................. 2005-251832

(51) Int. Cl.
*G02F 1/035* (2006.01)
(52) U.S. Cl. ...................... 385/3; 385/1; 385/2; 385/5; 385/8; 385/37; 359/328; 359/329
(58) Field of Classification Search ............... 385/1, 385/2, 3, 4, 5, 8, 9, 14, 129, 130, 131, 132, 385/40, 41, 37; 359/237, 238, 245, 276, 359/298, 328, 329
See application file for complete search history.

(56) References Cited

U.S. PATENT DOCUMENTS 5,148,503 A * 9/1992 Skeie .............................. 385/3

(Continued)

FOREIGN PATENT DOCUMENTS

JP   63-005306   1/1988

(Continued)

OTHER PUBLICATIONS

Kawanishi, T. et al., "Resonant-type optical modulator with planar structures," The Institute of Electronics, Information and Communication Engineers, Technical Report of IEICE, LQE2001-3 (May 2001), pp. 13-18.

(Continued)

*Primary Examiner*—Brian M Healy
(74) *Attorney, Agent, or Firm*—Myers Wolin, LLC

(57) ABSTRACT

It is an object of the present invention to provide a DSB-SC system capable of suppressing a third order component. The DSB-SC modulation having high extinction ratio can be realized by adjusting the first order component, which is generated by applying a modulation signal ($3f_m$), and the third order component, which is generated by applying a basic signal ($f_m$), to have reversed phase and the same intensity level, and then by applying the first order component to the third order component, these two components cancel each other.

14 Claims, 4 Drawing Sheets

U.S. PATENT DOCUMENTS

| | | | | |
|---|---|---|---|---|
| 5,278,923 | A | * | 1/1994 | Nazarathy et al. ............... 385/3 |
| 5,422,966 | A | * | 6/1995 | Gopalakrishnan et al. ....... 385/2 |
| 5,644,664 | A | * | 7/1997 | Burns et al. ..................... 385/2 |
| 6,219,469 | B1 | | 4/2001 | Minakata et al. ................ 385/2 |
| 6,411,747 | B2 | | 6/2002 | Rangaraj ........................ 385/2 |
| 6,556,727 | B2 | | 4/2003 | Minakata et al. ................ 385/2 |
| 6,674,565 | B2 | | 1/2004 | Kondo et al. ................. 359/322 |
| 6,791,733 | B2 | | 9/2004 | Kawanishi et al. ........... 359/245 |
| 6,983,085 | B2 | | 1/2006 | Kataoka et al. ................ 385/3 |
| 7,106,497 | B2 | | 9/2006 | Kawanishi et al. ........... 359/326 |
| 2002/0080454 | A1 | * | 6/2002 | Schemmann et al. ........ 359/181 |
| 2009/0232440 | A1 | * | 9/2009 | Kawanishi et al. .............. 385/3 |

FOREIGN PATENT DOCUMENTS

| | | |
|---|---|---|
| JP | 63-013017 | 1/1988 |
| JP | 2000-267056 | 9/2000 |

OTHER PUBLICATIONS

Nishihara, H. et al., "Optical Integrated Circuits," (revised and updated edition), Ohmsha, pp. 119-120.

Kawanishi, T., et al., "Optical frequency shifter with SSB modulator," Technical Report of IEICE, OCS2002-49, PS2002-33, OFT2002-30 (Aug. 2002), pp. 69-74.

Kawanishi, T., et al., "Optical FSK modulator using an integrated lightwave circuit consisting of four optical phase modulators," CPT-Archives, CPT Digest vol. 07, G-3, pp. 139-140 (2004).

Kawanishi, T., et al., "Ultra high extinction ratio intensity modulation using optical FSK modulator," IEICE Technical Report, OCS2005-42 (Aug. 2005), pp. 41-44.

Kawanishi, T., et al., "Linear Single-Sideband Modulation for High-SNR Wavelength Conversion," IEEE Photonics Technology Letters, vol. 16, No. 6, Jun. 2004, pp. 1534-1536.

Kawanishi, T., et al., "High-Speed Optical FSK Modulator for Optical Packet Labeling," Journal of Lightwave Technology, vol. 23, No. 1, Jan. 2005, pp. 87-94.

Kawanishi, T. et al., "Simultaneous optical modulation of FSK and IM," Technical Record of IEICE, EMD2004-47, CPM2004-73, OPE2004-130, LQE2004-45(Aug. 2004), pp. 41-46.

International Preliminary Report on Patentability dated Mar. 13, 2008 for International Application No. PCT/JP2006/317098, international filing date Aug. 30, 2006.

European Extended Search Report dated Aug. 26, 2009 for corresponding European Application No. 06797071.5.

Kawanishi, T. et al., "Suppression of Optical Harmonics in Wavelength Conversion Using Optical Single Sideband Modulator" Optical Fiber Communication Conference. Postconference Digest, Atlanta, GA, Mar. 23, 2003, pp. 771-772.

Kawanishi, et al. "Optical frequency control by using optical single-sideband modulation technique", 2005 Digest of the LEOS Summer Topical Meetings, San Diego, CA, USA Jul. 25-27, 2005, pp. 109-110.

* cited by examiner

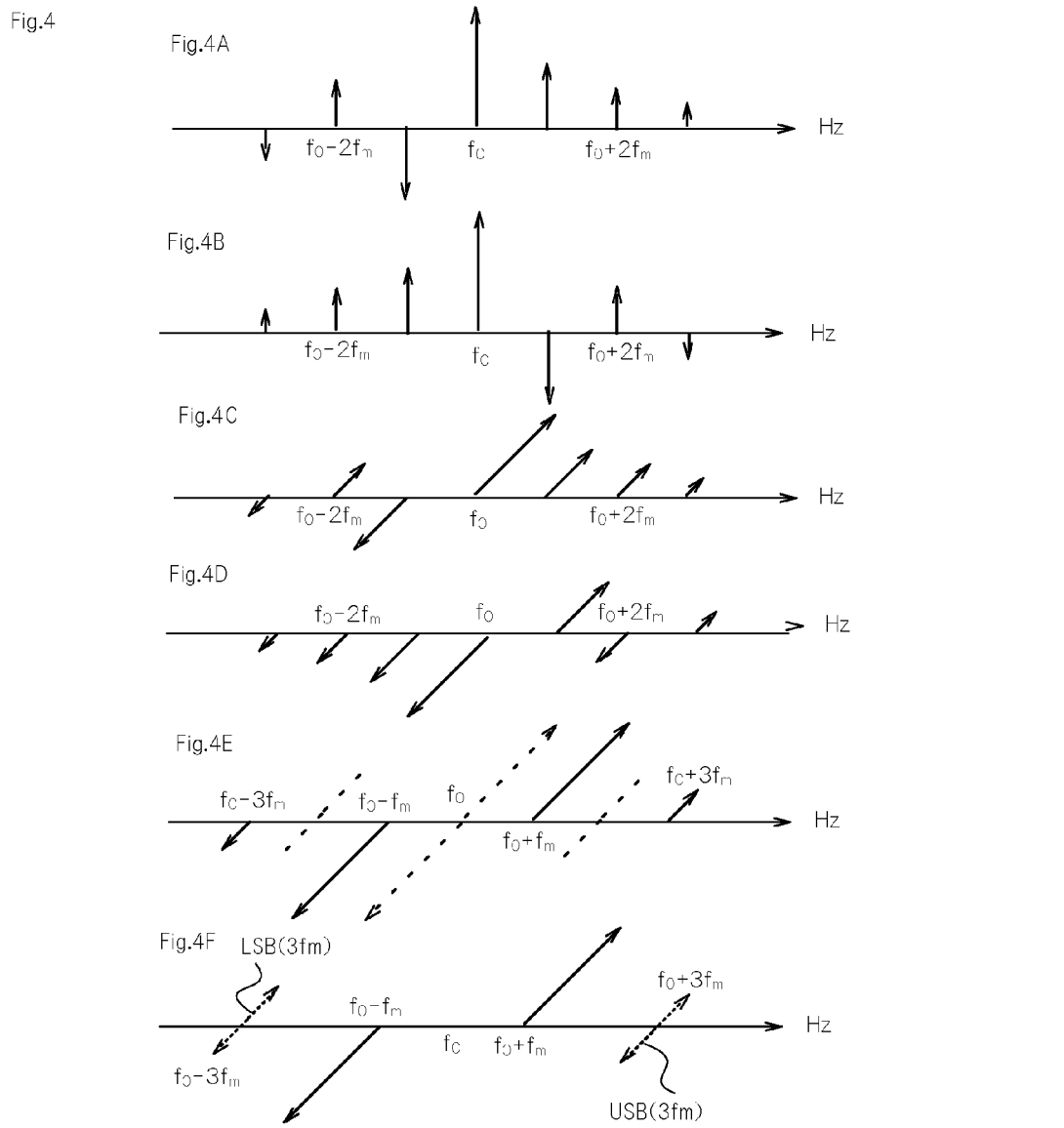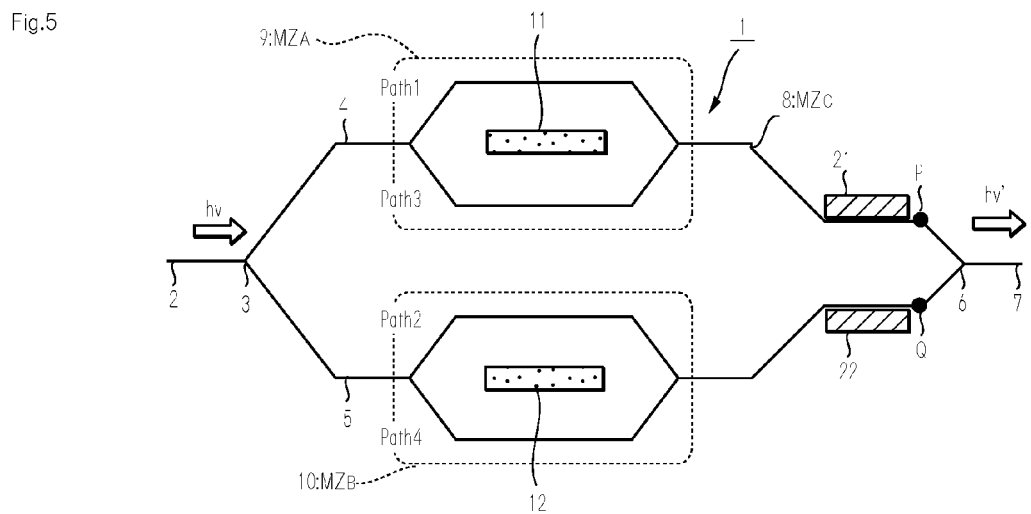

Fig.10
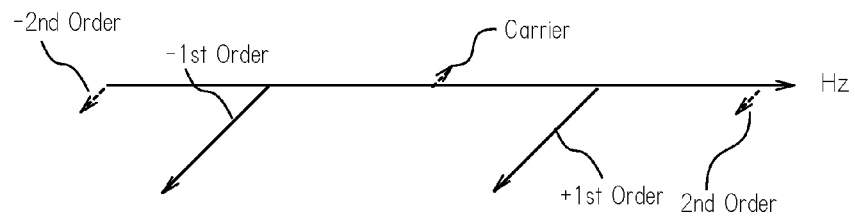
Fig.11
Fig.11A
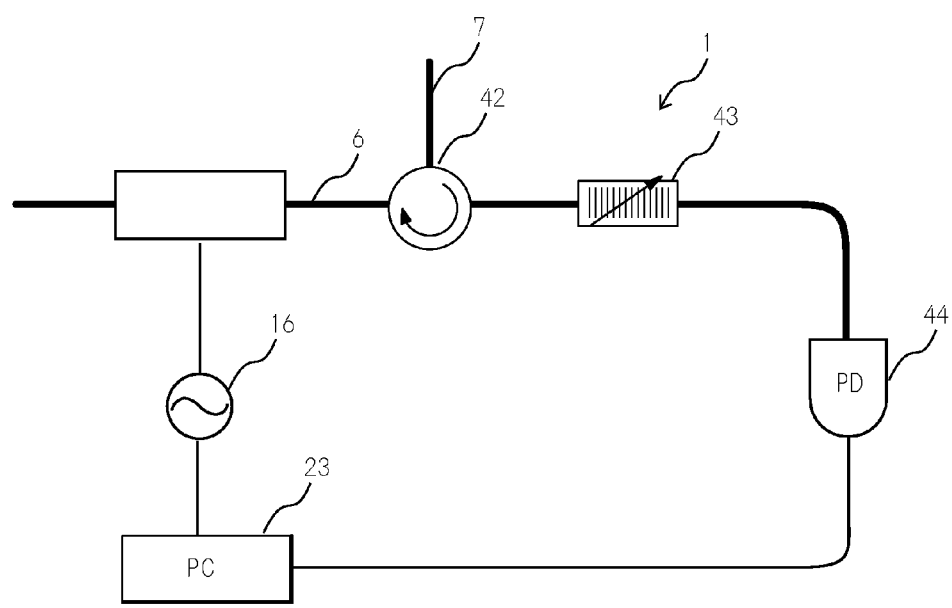
Fig.11B
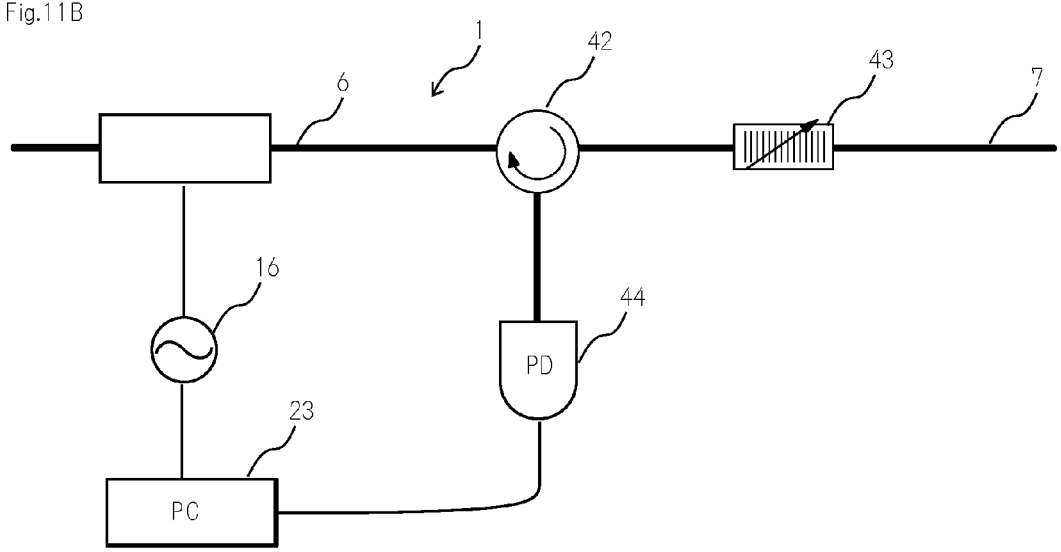

OPTICAL AMPLITUDE MODULATION SYSTEM CAPABLE OF CANCELLING HIGH ORDER COMPONENT

CROSS REFERENCE TO RELATED APPLICATIONS

The present disclosure is a national phase filing under 35 U.S.C. §371 of International Patent Application No.PCT/JP2006/317098 filed on Aug. 30, 2006, which claims priority to Japanese Patent Application No. 2005-251832 filed on Aug. 31, 2005, the disclosures of which are expressly incorporated herein by reference in its entireties.

BACKGROUND OF THE INVENTION

1. Field of the Invention

The present invention basically relates to an optical amplitude modulation system. In particular, the present invention is directed to an optical amplitude modulation system which is capable of performing high extinction ratio modulation by suppressing high order components which are generated when DSB modulation is performed.

2. Description of the Related Art

In optical communication, light is modulated to have signal information. As optical modulation, direct modulation and external modulation are known. The direct modulation modulates a driving power of semiconductor laser. And the external modulation modulates light from semiconductor laser by means other than light source. A modulator used in direct modulation is generally called an optical modulator. The optical modulator modulates optical intensity, phase, etc. by causing physical changes in the optical modulator based on signals. As technical problems of the optical modulator, there exist reduction of driving voltage, realization of a higher extinction ratio for improving modulation efficiency, widening a bandwidth, and improvement of high light utilization efficiency for speeding up and loss reduction of a modulation. In other words, development of a modulator having high extinction ratio is desired. It is to be noted that the extinction ratio is a ratio of optical intensity of the highest level to the lowest level.

An optical signal side-band (optical SSB) modulator is a modulator which shifts frequency of an optical signal and outputs the optical signal [Tetsuya Kawanishi and Masayuki Izutsu, "Optical frequency shifter using optical SSB modulator", TECHNICAL REPORT OF IEICE, OCS2002-49, PS2002-33, OFT2002-30 (2002-08)].

An optical FSK modulator which is a modification of an optical SSB modulator is also known [Tetsuya Kawanishi and Masayuki Izutsu, "Optical FSK modulator using an integrated light wave circuit consisting of four optical phase modulator", CPT 2004G-2, Tokyo, Japan, 14-16 Jan. 2004] [Tetsuya Kawanishi, et al. "Analysis and application of FSK/IM simultaneous modulation" Tech. Rep. of IEICE. EMD 2004-47, CPM 2004-73, OPE 2004-130, LQE 2004-45 (2004-08), pp. 41-46].

In order to remove a third order component, a following technique by means of the optical SSB modulator is known. The technique is applying a signal whose frequency is controlled and also applying an electric signal which is controlled so that third order components and optical signals are reversed in phase (see, for example, Japanese Unexamined Patent Application Publication No. 2004-77835).

On the other hand, carrier signal suppressed DSB-SC modulator is also known. This modulator generates high order components (especially, odd order components), but these components are not thought to be a substantial problem. Since the DSB-SC modulator and the optical SSB modulator have different voltage levels applied and different methods of applying the voltage, there is a problem that a method of removing the third order components which is taken by the SSB modulator cannot be applied to the DSB-SC modulator.

It is an object of the present invention to provide a new optical amplitude modulation system.

It is an object of the present invention to provide an optical amplitude modulation system capable of suppressing the third order components, thereby obtaining a high extinction ratio.

SUMMARY OF THE INVENTION

The present invention is based on the following idea. The first order component ($f_0 \pm 3f_m$) is generated by applying a signal ($3f_m$) as a modulation signal. And the third order component ($f_0 \pm 3f_m$) is generated by applying a basic signal ($f_m$) as a modulation signal. In the optical modulation such as the DSB-SC modulation, by adjusting the first order component and the third order component to have reversed phase and the same intensity level, these two components cancel each other and optical modulation such as a DSB-SC modulation with high extinction ratio can be realized.

In other word, the optical amplitude modulation system (1) according to the first aspect of the present invention comprises: a Mach-Zehnder waveguide (8) including an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal that are combined at the combining part (6); a first intensity modulator (9) which is provided on the first arm (4), and controls amplitude of the optical signal propagating through the first arm (4); a second intensity modulator (10) which is provided on the second arm (5), and controls amplitude of the optical signal propagating through the second arm (5); a first electrode (electrode A) (11) of the first intensity modulator (9); a second electrode (electrode B) (12) of the second intensity modulator (10); a third electrode (electrode C) (13) which controls a phase difference between the optical signal propagating through the first arm (4) and the optical signal propagating through the second arm (5), and to which a modulation signal is applied; and a signal source part (16) which comprises: a first signal source (14) for supplying bias voltage which is applied to the first electrode (electrode A) (11), the second electrode (electrode B) (12), and the third electrode (electrode C) (13); and a second signal source (15), which is a high frequency signal source, for supplying a radio frequency signal to the third electrode (electrode C) (13), wherein the second signal source (15) comprises: a third harmonic signal generator (17) for generating an electric signal ($3f_m$) which have a frequency three times the frequency of a basic signal ($f_m$); a phase adjusting part (18) for adjusting a phase difference between a phase of the basic signal ($f_m$) and a phase of the electric signal ($3f_m$), wherein the basic signal ($f_m$) is outputted from the second signal source (15), the electric signal ($3f_m$) is outputted from the third harmonic signal generator (17), the electric signal ($3f_m$) has a frequency three times the frequency of the basic signal ($f_m$); and a signal intensity adjusting part (19) for adjusting intensity of the basic signal ($f_m$) or the electric signal ($3f_m$), wherein the basic signal ($f_m$) is outputted from the second signal source (15), the electric signal ($3f_m$) is generated from the third harmonic signal generator (17), the electric signal ($3f_m$) has a frequency three times the frequency of the basic signal ($f_m$).

The operation of the optical amplitude modulator (1) according to the first aspect of the present invention is as follows. The third harmonic signal generator (17) generates a third harmonic signal as an electric signal ($3f_m$) which has a frequency three times of the frequency of the basic signal ($f_m$). The second signal source (high frequency signal source) (15) generates the basic signal ($f_m$). Then the phase adjusting part (18) adjusts phase difference between the phase of the basic signal ($f_m$) and the phase of the electric signal ($3f_m$). And the signal intensity adjusting part (19) adjusts intensity of the electric signal ($3f_m$). And the modulation signal ($3f_m$), which generates a first order component ($f_0 \pm 3f_m$), is applied to the third order component ($f_0 \pm 3f_m$), which is generated by applying the basic signal ($f_m$), after the third harmonic signal ($3f_m$) has been adjusted so that the first order component and the third order component have reversed phase and the same intensity level. Thus, the first order component and the third order component cancel each other, and an optical amplitude modulation with a high extinction ratio can be realized.

It is to be noted that in the optical amplitude modulation of the present invention, both of the modulation signal whose frequency is ($f_m$) and the modulation signal whose frequency is ($3f_m$) are applied to the electrode C.

The optical amplitude modulation system (1) according to the first aspect of the present invention has the first intensity modulator (9) which is preferably a Mach-Zehnder waveguide having the first electrode (electrode A) (11), and the second intensity modulator (10) which is preferably a Mach-Zehnder waveguide having the second electrode (electrode B) (12).

It is to be noted that suppressing the components other than the third order components is also a preferable embodiment of the optical amplitude modulation system according to the first aspect of the present invention. This is realized by applying an electric signal which is adjusted so as to obtain optical signals having reversed phase and the same level of intensity to the electrode C. The optical amplitude modulation system according to the first aspect of the present invention is preferably used as a DSB-SC modulator.

The optical amplitude modulation system (1) according to the second aspect of the present invention is the optical amplitude modulation system (1) as claimed in claim 1, wherein the third electrode (electrode C) (13) further comprises: an electrode ($MZ_{CA}$ electrode) (21) which is provided along the first arm (4) between the first intensity modulator (9) and the combining part (6); and an electrode ($MZ_{CB}$ electrode) (22) which is provided along the second arm (5) between the second intensity modulator (10) and the combining part (6).

As above described, since the optical amplitude modulation system comprises the $MZ_{CA}$ electrode and the $MZ_{CB}$ electrode (in other words, the optical amplitude modulation system has two main Mach-Zehnder electrodes (electrode C)), components to be suppressed (carrier, second order components, third order components, and the like) can be effectively suppressed by controlling a signal so as to have reversed phase. Above all, even order components such as a carrier component and a second order component which are not ideally generated and have little intensity in reality can be effectively removed by the DSB-SC modulation system.

The optical amplitude modulation system according to the third aspect of the present invention relates to the above described optical amplitude modulation system further comprising: either one or both of an optical intensity compensation mechanism (31) and an optical intensity compensation mechanism (32), wherein the optical intensity compensation mechanism (31) is provided along the first arm (4) between the first intensity modulator (9) and the combining part (6), the optical intensity compensation mechanism (32) is provided along the second arm (5) between the second intensity modulator (10) and the combing part (6).

Since the optical amplitude modulation system comprises the optical intensity compensation mechanism (e.g. intensity modulator), and adjusts the intensities of components to be suppressed to the same level effectively, the optical amplitude modulation system is able to suppress the components to be suppressed effectively. It is to be noted that the optical amplitude modulation system according to the third aspect of the present invention is preferably used as a DSB-SC modulator.

The optical amplitude modulation system according to the fourth aspect of the present invention is the optical amplitude modulation system comprising: the optical amplitude modulation system as above mentioned which acts as an optical amplitude modulator; either one or both of a phase modulator and an intensity modulator for modulating output light from the optical amplitude modulator or input light to the optical amplitude modulator; and a control part for adjusting modulation time of a modulation signal of the optical amplitude modulator and a modulation signal of the phase modulator or the intensity modulator.

The optical amplitude modulation system according to the fourth aspect of the present invention relates to an optical amplitude modulation system which comprises: an optical amplitude modulation system; and a phase and intensity modulator (specifically, two-electrode MZ-type modulator) which modulates output light or input light of the optical amplitude modulator, and the like.

There remain unsuppressed carrier components in the output of the optical amplitude modulator. These unsuppressed carrier components prevent extinction ratio from improving. However, an optical amplitude modulation system with high extinction ratio can be realized by the following process.

A phase modulation and/or an intensity modulation are performed to the output light from the optical amplitude modulator, or a modulation is performed to an input light so that the unsuppressed components are suppressed. In this process, phase and timing of sidebands offset form the first sidebands (whose frequency is equal to that of a carrier or a high order component) are adjusted so that carrier components (or high order components) are suppressed. Thus, carrier components (or high order components) can be suppressed, thereby realizing an optical modulation system which can perform high extinction ratio modulation.

A preferable embodiment of the optical amplitude modulation system according to the fourth aspect of the present invention is as follows.

The optical amplitude modulator outputs double side band signals. Then, the phase modulator or the intensity modulator modulates either one or both of the double side band signals, and the other double side band signals are generated. The control part controls so that a frequency of either one of the double side band signals become equal to a frequency of an optical carrier signal or a high order optical signal of output light from the optical amplitude modulator, and the optical carrier signal or the high order optical signal is cancelled.

The other preferable embodiment of the optical amplitude modulation system according to the fourth aspect of the present invention is as follows.

The phase modulator or the intensity modulator modulates outputs double side band signals. Then, the optical amplitude modulator modulates the double side band signals, and the other double side band signals are generated. The control part controls so that a frequency of either one of the double side band signals become equal to a frequency of an optical carrier signal or a high order optical signal of output light from the optical amplitude modulator, and the optical carrier signal or the high order optical signal is cancelled.

It is to be noted that a preferable embodiment of the optical amplitude modulator according to the fourth aspect of the present invention is an embodiment as the DSB-SC modulation system.

An optical amplitude modulation system according to the fifth aspect of the present invention is the above described optical amplitude modulation system which further comprises: a circulator wherein the optical signal which have been combined at the combining part is inputted; and a fiber grating wherein output light from the circulator is inputted.

This embodiment of the optical amplitude modulation system is preferable because the fiber grating and the circulator removes unnecessary components and the removed components can be used as feedback signals.

An optical amplitude modulation system according to the sixth aspect of the present invention is the above described optical amplitude modulation system which further comprises: a control part which is connected to a detecting part of an output signal from the Mach-Zehnder waveguide (8), and outputs a control signal for controlling voltage applied to each electrode to a signal source, wherein the control part (i) adjusts voltage applied to the first electrode (electrode A) (11), the second electrode (electrode B) (12), and the third electrode (electrode C) (13) so as to increase output from the Mach-Zehnder waveguide (8), (ii) adjusts bias voltage applied to the third electrode (electrode C) (13) so as to decrease output from the Mach-Zehnder waveguide (8), (iii) decreases bias voltage of either one of the sub Mach-Zehnder electrodes so as to decrease output from the Mach-Zehnder waveguide (8), and (iv) adjusts bias voltage applied to the third electrode (electrode C) (13) so as to decrease output from the Mach-Zehnder waveguide (8).

The optical amplitude modulation system according to the sixth aspect of the present invention is preferably and automatically able to obtain a preferable bias voltage level by a bias adjustment method comprising the steps of:

(i) adjusting voltage applied to the first electrode (electrode A) (11), the second electrode (electrode B) (12), and the third electrode (electrode C) (13) so as to increase output from the Mach-Zehnder waveguide (8);

(ii) adjusting bias voltage applied to the third electrode (electrode C) (13) so as to decrease output from the Mach-Zehnder waveguide (8);

(iii) decreasing bias voltage of either one of the sub Mach-Zehnder electrodes so as to decrease output from the Mach-Zehnder waveguide (8); and (iv) adjusting bias voltage applied to the third electrode (electrode C) (13) so as to decrease output from the Mach-Zehnder waveguide (8).

By using the bias voltage having been adjusted in this way, in other words, by using a signal with relatively less carrier components or relatively less high order components, these components are suppressed by the method above explained. Therefore, the components to be suppressed can be suppressed more effectively.

An optical amplitude modulation system according to the seventh aspect of the present invention is an optical modulation system comprises: an optical modulator; a circulator wherein an output signal from the optical modulator is inputted; a fiber grating wherein output light from the circulator is inputted, the fiber grating reflects predetermined optical signal components outputted from the optical modulator, the fiber grating transmits the other optical signal components; a photodetector which detects the optical signal that have transmitted through the fiber grating; and a control part controlling a signal based on the optical signal detected by the photodetector, wherein the signal is outputted from a signal source which applies a signal to the optical modulator.

This system, the same as the optical amplitude modulation system according to the fifth aspect of the present invention, effectively derives a predetermined optical signal, then isolates unnecessary optical signal components and controls a signal source system so that the intensity of the isolated components to be lowered. Thus, unnecessary components are effectively reduced.

A preferable optical modulation system according to the seventh aspect of the present invention is preferably the above described optical modulation system which comprises: a Mach-Zehnder waveguide (8) including an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal that are combined at the combining part (6); a first intensity modulator (9) which is provided on the first arm (4), and controls amplitude of the optical signal propagating through the first arm (4); a second intensity modulator (10) which is provided on the second arm (5), and controls amplitude of the optical signal propagating through the second arm (5); a first electrode (electrode A) (11) of the first intensity modulator (9); a second electrode (electrode B) (12) of the second intensity modulator (10); a third electrode (electrode C) (13) which controls a phase difference between the optical signal propagating through the first arm (4) and the optical signal propagating through the second arm (5), and to which a modulation signal is applied; and a signal source part (16) which comprises: a first signal source (14) for supplying bias voltage which is applied to the first electrode (electrode A) (11), the second electrode (electrode B) (12), and the third electrode (electrode C) (13); and a second signal source (15), which is a high frequency signal source, for supplying a radio frequency signal to the third electrode (electrode C) (13), The present invention is able to provide an optical amplitude modulation system which is able to suppress a carrier component ($f_0$) and a high order component (e.g. a second order component ($f_0 \pm 2f_m$)) and obtain high extinction ratio.

BRIEF DESCRIPTION OF THE DRAWINGS

FIGS. 4A to 4F is a conceptual diagram describing intensity and phase of the optical signals of the DSB-SC modulation system. FIG. 4A is a conceptual diagram showing an optical signal spectrum on the first arm. FIG. 4B is a conceptual diagram showing an optical signal spectrum on the second arm. FIG. 4C is a conceptual diagram showing an optical signal spectrum on the first arm which is provided with a phase shift of +90 degrees. FIG. 4D is a conceptual diagram showing an optical signal spectrum on the second arm which is provided with a phase shift of −90 degrees. FIG. 4E is a conceptual diagram showing a spectrum of an output signal generated by interference of optical signals from the first arm and the second arm at the combining part. FIG. 4F is a conceptual diagram showing suppression of a third order signal component by applying a $3f_m$ signal.

FIG. 5 is a schematic block diagram showing an optical amplitude modulation system according to the second aspect of the present invention.

FIG. 10 is a schematic diagram showing a modulation signal outputted from an intensity modulator.

FIGS. 11A and 11B is a schematic diagram showing a basic arrangement of an optical amplitude modulation system according to the fifth aspect of the present invention. FIG. 11A shows a preferable embodiment of the optical amplitude modulation system according to the fifth aspect of the present invention. FIG. 11B shows the other embodiment of the optical amplitude modulation system according to the fifth aspect of the present invention.

DESCRIPTION OF THE PREFERRED EMBODIMENTS

Figure 1:
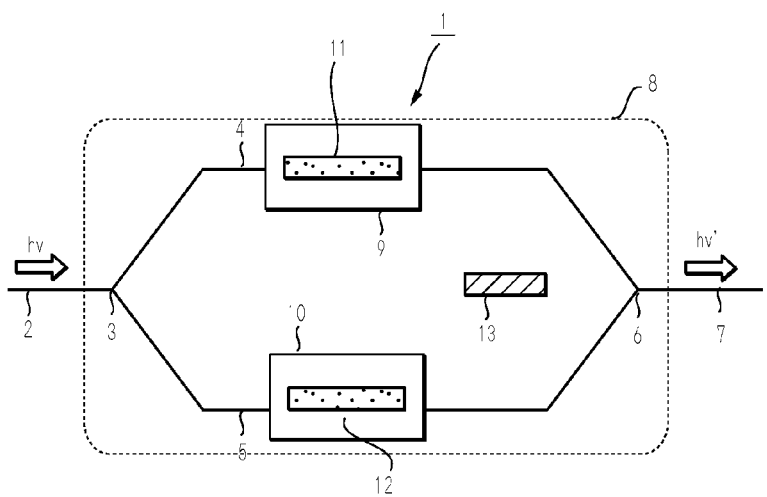
FIG. 1 is a schematic block diagram showing an optical modulation system of the present invention.
Figure 2:
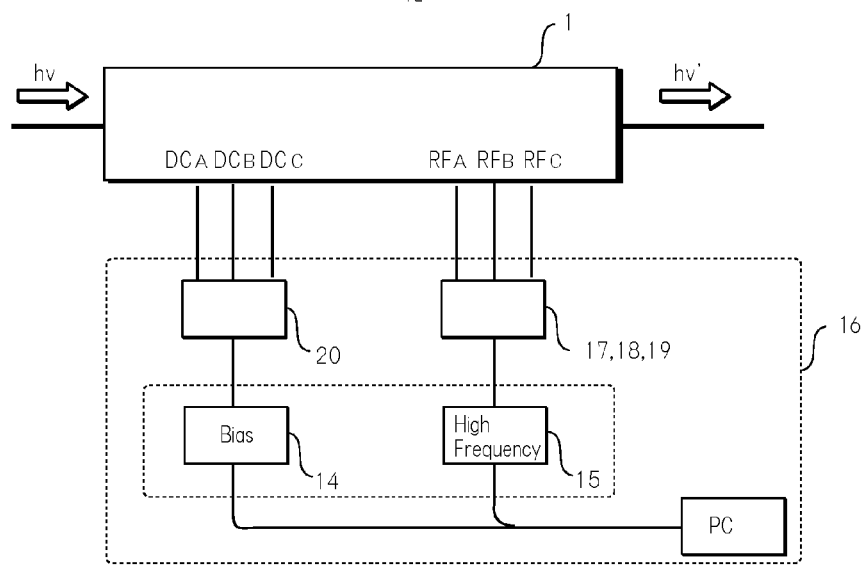
FIG. 2 (*a*) is a block diagram showing a signal source part of an optical modulation system of the present invention.

Hereinafter, the present invention is explained referring to figures. FIG. 1 is a schematic block diagram showing an optical amplitude modulation system of the present invention. FIG. 2 is a block diagram showing an optical amplitude modulation system of the present invention. As shown in FIG. 1 and FIG. 2, the optical amplitude modulation system (1) of the present invention relates to an optical amplitude modulation system which comprises: a Mach-Zehnder waveguide (8) including an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal that are combined at the combining part (6); a first intensity modulator (9) which is provided on the first arm (4), and controls amplitude of the optical signal propagating through the first arm (4); a second intensity modulator (10) which is provided on the second arm (5), and controls amplitude of the optical signal propagating through the second arm (5); a first electrode (electrode A) (11) of the first intensity modulator (9); a second electrode (electrode B) (12) of the second intensity modulator (10); a third electrode (electrode C) (13) which controls a phase difference between the optical signal propagating through the first arm (4) and the optical signal propagating through the second arm (5), and to which a modulation signal is applied; and a signal source part (16) which comprises: a first signal source (14) for supplying bias voltage which is applied to the first electrode (electrode A) (11), the second electrode (electrode B) (12), and the third electrode (electrode C) (13); and a second signal source (15), which is a high frequency signal source, for supplying a radio frequency signal to the third electrode (electrode C) (13), wherein the second signal source (15) comprises: a third harmonic signal generator (17) for generating an electric signal ($3f_m$) which have a frequency three times the frequency of a basic signal ($f_m$); a phase adjusting part (18) for adjusting a phase difference between a phase of the basic signal ($f_m$) and a phase of the electric signal ($3f_m$), wherein the basic signal ($f_m$) is outputted from the second signal source (15), the electric signal ($3f_m$) is outputted from the third harmonic signal generator (17), the electric signal ($3f_m$) has a frequency three times the frequency of the basic signal ($f_m$); and a signal intensity adjusting part (19) for adjusting intensity of the basic signal ($f_m$) or the electric signal ($3f_m$), wherein the basic signal ($f_m$) is outputted from the second signal source (15), the electric signal ($3f_m$) is generated from the third harmonic signal generator (17), the electric signal ($3f_m$) has a frequency three times the frequency of the basic signal ($f_m$).

It is to be noted that the optical amplitude modulation system of the present invention is preferably used as an optical carrier suppressed double side band (DSB-SC) modulation system (1).

The operation of the optical amplitude modulation system (1) according to the first aspect of the present invention is as follows. The third harmonic signal generator (17) generates a third harmonic signal as an electric signal ($3f_m$) which has a frequency three times of the frequency of a basic signal ($f_m$). The second signal source (high frequency signal source) (15) generates the basic signal ($f_m$). Then the phase adjusting part (18) adjusts phase difference between a phase of the basic signal ($f_m$) and a phase of the electric signal ($3f_m$). And the signal intensity adjusting part (19) adjusts intensity of the electric signal ($3f_m$). And the third harmonic signal, whose frequency ($3f_m$) is three times the frequency of the basic signal ($f_m$), is applied to the electrode. Since the third harmonic signal have been adjusted so that its first order component ($f_0 \pm 3f_m$) and a third order component, which is generated by applying the basic signal ($f_m$), have reversed phase and about the same intensity level, these two components cancel each other, and optical modulation with high extinction ratio can be realized.

It is to be noted that in the optical amplitude modulation system of the present invention, both of the basic signal whose frequency is ($f_m$) and the third harmonic signal whose frequency is ($3f_m$) are preferably applied to the electrode C.

Figure 3:
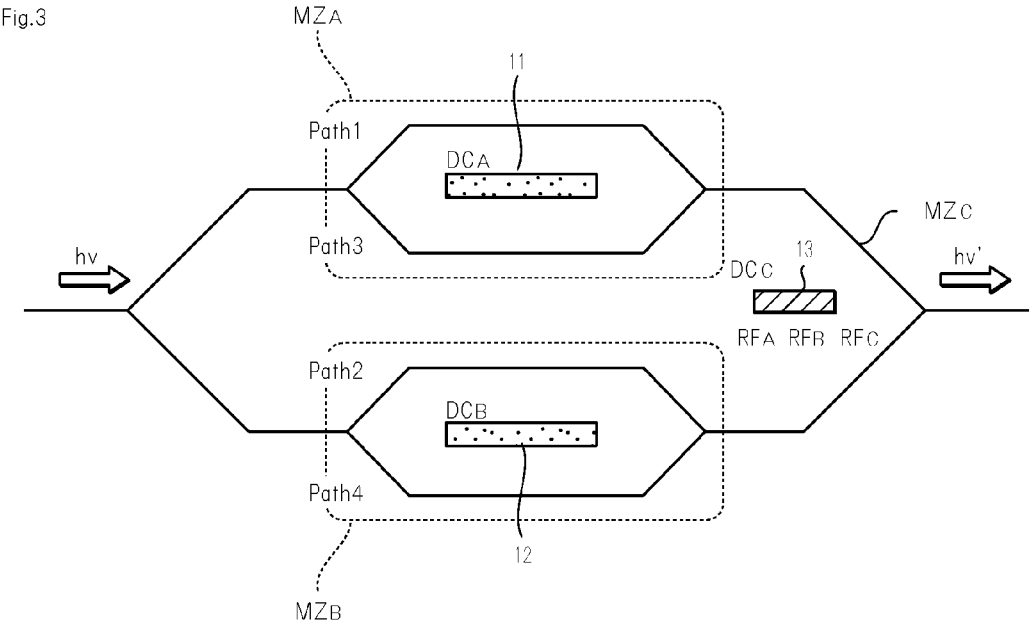
FIG. 3 is a schematic diagram showing a preferable embodiment of the optical amplitude modulation system according to the first aspect of the present invention.

FIG. 3 is a schematic diagram showing a preferable embodiment of the optical amplitude modulation system according to the first aspect of the present invention. As shown in FIG. 3, the preferable embodiment of the optical amplitude modulation system according to the first aspect of the present invention is that the first intensity modulator (9) is a Mach-Zehnder waveguide having the first electrode (electrode A) (11) and the second intensity modulator (10) is a Mach-Zehnder waveguide having the second electrode (electrode B) (12).

As shown in FIG. 3, the optical amplitude modulation system of this embodiment comprises: a Mach-Zehnder waveguide (8) including an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal that are combined at the combining part (6); a first intensity modulator (9) which is provided on the first arm (4), and controls amplitude of the optical signal propagating through the first arm (4); a second intensity modulator (10) which is provided on the second arm (5), and controls amplitude of the optical signal propagating through the second arm (5); a first electrode (electrode A) (11) of the first intensity modulator (9); a second electrode (electrode B) (12) of the second intensity modulator (10) a third electrode (electrode C) (13) which controls a phase difference between the optical signal propagating through the first arm (4) and the optical signal propagating through the second arm (5), and to which a modulation signal is applied; and a signal source part (16) which comprises: a first signal source (14) for supplying bias voltage which is applied to the first electrode (electrode A) (11), the second electrode (electrode B) (12), and the third electrode (electrode C) (13); and a second signal source (15), which is a high frequency signal source, for supplying a radio frequency signal to the third electrode (electrode C) (13), wherein the second signal source (15) comprises: a third harmonic signal generator (17) for generating an electric signal ($3f_m$) which have a frequency three times the frequency of a basic signal ($f_m$); a phase adjusting part (18) for adjusting a phase difference between a phase of the basic signal ($f_m$) and a phase of the electric signal ($3f_m$), wherein the basic signal ($f_m$) is outputted from the second signal source (15), the electric signal ($3f_m$) is outputted from the third harmonic signal generator (17), the electric signal ($3f_m$) has a frequency three times the frequency of the basic signal ($f_m$); and a signal intensity adjusting part (19) for adjusting intensity of the basic signal ($f_m$) or the electric signal ($3f_m$), wherein the basic signal ($f_m$) is outputted from the second signal source (15), the electric signal ($3f_m$) is generated from the third harmonic signal generator (17), the electric signal ($3f_m$) has a frequency three times the frequency of the basic signal ($f_m$), and the optical amplitude modulation system, wherein the first intensity modulator (9) is a first sub Mach-Zehnder electrode having the first electrode (electrode A) (11), and the second intensity modulator (10) is a second sub Mach-Zehnder electrode having the second electrode (electrode B) (12).

In this optical amplitude modulation system, since the intensity modulators which are provided on each arms are configured as Mach-Zehnder waveguides respectively, the entire part is referred to as a main Mach-Zehnder ($MZ_C$), and the Mach-Zehnder waveguides which are provided on each arms are referred to as sub Mach-Zehnder waveguides ($MZ_A$, $MZ_B$). Electrodes provided on $MZ_A$, $MZ_B$, and $MZ_C$ are, for example, referred to as electrode A, electrode B, and electrode C respectively. Electrodes which apply bias voltage to $MZ_A$, $MZ_B$, and $MZ_C$ are, for example, referred to as $DC_A$ electrode, $DC_B$ electrode, and $DC_C$ electrode respectively. Also, in the optical amplitude modulation system, modulation signals are applied to the electrode C. The modulation signals are generally radio frequency signals. The ones that modulate optical signals propagating through the $MZ_A$, the $MZ_B$, and the $MZ_C$ are, for example, conceptually referred to as $RF_A$ electrode, $RF_B$ electrode, and $RF_C$ electrode.

In the optical amplitude modulation system according to this embodiment, the electrode A acts as the $DC_A$ electrode, the electrode B acts as the $DC_B$ electrode, and the electrode C acts as the $DC_C$ electrode, the $RF_A$ electrode, the $RF_B$ electrode, and the $RF_C$ electrode.

Hereinafter, each element of the optical modulation system according to this embodiment is explained. The Mach-Zehnder waveguide (8) is the same as the one shown in FIG. 1. And as shown in FIG. 3, the Mach-Zehnder waveguide (8) comprises: an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal that are combined at the combining part (6).

A Mach-Zehnder waveguide, for example, is provided with a waveguide of nearly hexagonal shape (which composes two arms of the Mach-Zehnder), and is provided with two parallel-aligned phase modulators. The phase modulators are realized by electrodes laid along with the waveguides.

A Mach-Zehnder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3V}$, $C_3$, $D_3$, $C_{3h}$, and $D_{3h}$. These materials have a refractive index adjusting function in which a change in the refractive index due to the application of an electric field has a different sign depending on a mode of propagation light. As a specific example, lithium tantalite oxide ($LiTO_3$: LT), $\beta$-$BaB_2O_4$ (abbr. BBO), $LiIO_3$ and the like can be used other than lithium niobate.

The dimension of the substrate is not particularly limited if it is large enough to be able to form a predefined waveguide. The width, the length, and the depth of each waveguide is also not particularly limited if the module of the present invention is able to fulfill its function. The width of each waveguide can be, for example, around 1 μm to 20 μm, preferably about 5 μm to 10 μm. The depth (the thickness) of waveguide can be 10 nm to 1 μm, preferably 50 nm to 200 nm.

The first intensity modulator (9) is provided on the first arm (4), and controls amplitude of the optical signal propagating through the first arm (4). The second intensity modulator (9)

is provided on the first arm (4), and controls amplitude of the optical signal propagating through the first arm (4). As shown in FIG. 1, the first intensity modulator (9) is, for example, a Mach-Zehnder waveguide having the first electrode (electrode A) (11), and the second intensity modulator (10) is, for example, a Mach-Zehnder waveguide having the second electrode (electrode B) (12)

When the central frequency of the input signal of the intensity modulator is supposed to be $f_0$, and the modulation frequency is supposed to be $f_m$, frequencies of the main output signals of the intensity modulator are, for example, $f_0$, $f_0 \pm f_m$, and ($f_0+f_m$ and $f_0-f_m$). It is to be noted that among the above frequencies, frequency $f_0$ with the highest optical intensity may be acceptable. But a preferable one is that optical intensity of either one or both of the $f_0 \pm f_m$ are between 1/10 and 1/1 of the optical intensity of frequency $f_0$.

The third electrode (electrode C) (13) controls a phase difference between the optical signal propagating through the first arm (4) and the optical signal propagating through the second arm (5). The third electrode (electrode C) (13) is also applied a modulation signal.

The first bias adjustment electrode ($DC_A$ electrode) is an electrode for controlling a phase of light propagating thorough the two arms of the $MZ_A$ by controlling bias voltage between two arms (path 1 and Path 3) composing the $MZ_A$. On the other hand, the second bias adjustment electrode ($DC_B$ electrode) is an electrode for controlling a phase of light propagating thorough the two arms of the $MZ_B$ by controlling bias voltage between two arms (path 2 and Path 4) composing the $MZ_B$. Direct current or low frequency signal is preferably applied to the $DC_A$ electrode and the $DC_B$ electrode in general. It is to be noted that "low frequency" of the low frequency electrode means frequency of, for example, 0 Hz to 500 MHz. A phase modulator for adjusting a phase of an electric signal is preferably provided at the output of the signal source of this low frequency signal in order to be able to control a phase of an output signal.

The first modulation electrode ($RF_A$ electrode) is an electrode for applying radio frequency (RF) signals to optical signals which have propagated through the two arms composing the $MZ_A$. On the other hand, the second modulation electrode ($RF_B$ electrode) is an electrode for applying RF signals to optical signals which have propagated through the two arms composing the $MZ_B$. The $RF_A$ electrode and the $RF_B$ electrode are, for example, traveling-wave-type electrodes or resonant-type electrodes, and preferably are resonant-type electrodes.

As explained above, two other electrodes may act as a $DC_C$ electrode and an $RF_C$ electrode separately, on the other hand, one electrode may act as those electrodes alone. In the latter case, a bias voltage and a radio frequency signal are applied to one electrode.

The $RF_A$ electrode and the $RF_B$ electrode are preferably connected to a high frequency electric signal source. The high frequency electric signal source is a device for controlling signals which are transmitted to the $RF_A$ electrode and the $RF_B$ electrode. A publicly known high frequency electric signal source can be adopted for the high frequency electric signal source. The range of frequency ($f_m$) inputted to the $RF_A$ electrode and the $RF_B$ electrode, for example, is from 1 GHz to 100 GHz. An output of the high frequency electric signal source is, for example, a sinusoidal wave having a fixed frequency. It is to be noted that a phase modulator is preferably provided at an output part of this high frequency signal source in order to be able to control phases of output signals.

The $RF_A$ electrode and the $RF_B$ electrode are composed of e.g. gold, platinum or the like. The width of the $RF_A$ electrode and the $RF_B$ electrode is, for example, 1 μm to 10 μm, and is specifically 5 μm. The length of the $RF_A$ electrode and the $RF_B$ electrode is, for example, 0.1 times to 0.9 times the wavelength ($f_m$) of the modulation signal, including 0.18 to 0.22 times or 0.67 to 0.70 times. And more preferably, it is shorter than the resonant point of the modulation signal by 20 to 25%. This is because with such a length, the synthesized impedance with a stub electrode remains in an appropriate region. More specifically, the length of the $RF_A$ electrode and the $RF_B$ electrode is, for example, 3250 μm. Hereinafter, a resonant-type electrode and a traveling-wave-type electrode are described.

A resonant-type optical electrode (resonant-type optical modulator) is an electrode for performing a modulation by using resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, LQE2001-3 (2001-05)] can be adopted as the resonant-type optical electrode.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "Optical Integrated Circuit" (revised and updated edition), Ohmsha, pp. 119-120). A publicly known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The RF electrode may act as both of the electrodes for the RF signal and the DC signal. Namely, either one of or both of the $RF_A$ electrode and the $RF_B$ electrode are connected to a feeder circuit (bias circuit) for supplying the DC signal and the RF signal mixed. In the SSB modulator of this embodiment, the RF electrode is connected to the feeder circuit (bias circuit), the RF signal (radio frequency signal) and the DC signal (direct current signal: signal related to bias voltage) can be inputted to the RF electrode.

The branching part of the main MZ waveguide ($MZ_C$) is a part where optical signals branch into the first sub MZ waveguide ($MZ_A$) and the second sub MZ waveguide ($MZ_B$). The branching part takes, for example, a Y-branching form. The combining part is a part where optical signals outputted from the first sub MZ waveguide ($MZ_A$) and the second sub MZ waveguide ($MZ_B$) are combined. The combining part takes, for example, a Y-branching form. The above Y-branching formed parts may be symmetry or asymmetry. As the branching part or the combining part, a directional coupler may be used.

The first main Mach-Zehnder electrode ($MZ_{CA}$ electrode) is laid along at least a part of the main Mach-Zehnder waveguide ($MZ_C$) between an output part of the first sub Mach-Zehnder waveguide ($MZ_A$) and the combining part. And, "at least a part" is a length long enough to be able to adjust phase of an output signal. An electrode which is the same one used as the sub Mach-Zehnder electrode can be adopted for the first main Mach-Zehnder electrode ($MZ_{CA}$ electrode).

The second main Mach-Zehnder electrode ($MZ_{CB}$ electrode) (12) is laid along at least a part of the main Mach-Zehnder waveguide ($MZ_C$) between an output part of the second sub Mach-Zehnder waveguide ($MZ_B$) and the combining part, which is the same as the $MZ_{CA}$ electrode (11). It is to be noted that the first main Mach-Zehnder electrode ($MZ_{CA}$ electrode) and the second main Mach-Zehnder electrode ($MZ_{CB}$ electrode) may make the waveguide portions whereon each of the electrodes is provided act as optical phase modulators.

It is preferable for the optical modulation system of the present invention to be provided with a control part which is electrically (or optically) connected to a signal source of each electrode so as to adequately control timing and phase of signals applied to each electrode. The control part acts as adjusting modulation time of signals applied to the $RF_A$ electrode, the $RF_B$ electrode, and the $RF_B$ electrode, (i.e. $RF_A$ signal, $RF_B$ signal, and $RF_B$ signal). In other words, the control part adjusts considering propagation time of light so that modulation by each electrode is performed to a certain signal. This modulation time is adequately adjusted based on, for example, a distance between each electrode.

The signal source part (16), for example, comprises the first signal source (14) and the second signal source (high frequency signal source) (15). The first signal source (14) applies bias voltage to the first electrode (electrode A) (11), the second electrode (electrode B) (12), and the third electrode (electrode C) (13). And the second signal source (high frequency signal source) (15) applies a radio frequency signal to the third electrode (electrode C) (13). Intensity, delay (phase), and apply timing of the bias voltage may be adjusted by an adjusting part (20) as needed.

The second signal source (high frequency signal source) (15), for example, comprises: a third harmonic signal generator (17) for generating an electric signal ($3f_m$) which have a frequency three times the frequency of a basic signal ($f_m$); a phase adjusting part (18) for adjusting a phase difference between a phase of the basic signal ($f_m$) and a phase of the electric signal ($3f_m$), wherein the basic signal ($f_m$) is outputted from the second signal source (15), the electric signal ($3f_m$) is outputted from the third harmonic signal generator (17), the electric signal ($3f_m$) has a frequency three times the frequency of the basic signal ($f_m$); and a signal intensity adjusting part (19) for adjusting intensity of the basic signal ($f_m$) or the electric signal ($3f_m$), wherein the basic signal ($f_m$) is outputted from the second signal source (15), the electric signal ($3f_m$) is generated from the third harmonic signal generator (17), the electric signal ($3f_m$) has a frequency three times the frequency of the basic signal ($f_m$).

A control part, for example, adjusts voltage applied to the electrode C so that phase difference of optical carrier signals or certain high order optical signals contained in output signals from the first waveguide ($MZ_A$) and the second waveguide ($MZ_B$) becomes 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device.

As the processing program, one that makes a computer have the following two means is adopted. One is a means for grasping phase of a certain component on each sub Mach-Zehnder, and the other is a means for generating an order to adjust a modulation signal applied to the electrode C so that the phase of a certain component is reversed by using phase information of the certain component grasped by the means for grasping.

It is to be noted that in case the optical modulator of the present invention acts as the DSB-SC modulator, the non-desired component cannot always be effectively suppressed by adjusting the electric signal so that the third order component and the like are cancelled. Therefore, it is preferable to adjust the third order component and the like to be cancelled by the above control part.

Hereinafter, the operation of the optical modulation system is described. The $MZ_C$ electrode controls the phase difference of the optical signal propagating through the first arm (4) and the second arm (5) of the Mach-Zehnder waveguide. When the phase difference of the optical signal propagating through the both arms is supposed to be g(t), and integer is represented by n, and if g(t) is equal to $2n\pi$, then the optical modulation system is ON state. On the other hand, if g(t) is equal to $(2n+1)\pi$, the optical modulation system is OFF state. In other words, in this OFF state case, the optical signal is converted to the high order radiation mode light, and emitted without being propagated to the output part. As this way, by adjusting voltage applied to electrodes of the modulation system, ON state and OFF state is switched over to output a signal.

In other words, the intensity of the output signal is proportional to $|\cos(g(t))/2|$. This is the reason why the Mach-Zehnder is referred to as intensity modulator. It is to be noted that the intensity in the OFF state is ideally zero. Therefore, the intensity ratio between On state and OFF state is ideally infinite. But, in reality, carrier components and high order components remain in the output signal. Therefore, the intensity cannot be zero in the OFF state. The extinction ratio, which is an intensity ratio between the ON state and the OFF state, is an important index to evaluate a characteristic of the Mach-Zehnder waveguide.

When a phase difference of optical signals of the both arms caused by bias voltage applied to the electrode C is supposed to be $\phi_B$, the frequency of the modulation signal applied to the electrode C is supposed to be ($f_m$), and g(t) is supposed to be $\sin 2A^{RF} \sin 2\pi f_m t + \phi_B$, then optical intensity ($D_1$) of the first order component (USB or LSB) and optical intensity ($D_2$) of the second order component are represented by the following formulas.

$$D_1 = \left| \frac{2A^{RF}\sin\phi_B}{1+(1-|A^{RF}|^2)\cos\phi_B} \right| \quad \text{Formula 1}$$

$$D_2 = \left| \frac{|A^{RF}|^2\cos\phi_B}{1+(1-|A^{RF}|^2)\cos\phi_B} \right|$$

It is understood from the above formulas that if the bias voltage is adjusted so that $\phi_B$ becomes $\pi$, an even order component, such as a second order component which has carrier component, will be 0, and an average intensity will be around $2|A^{RF}|$. The intensity of third or more order component does not remain substantially, and the intensity of a first order component (USB and LSB) remains, thereby realizing the DSB-SC modulation.

However, in the real optical modulation system such as DSB-SC modulation system, unsuppressed carrier component and unsuppressed high order component (especially, third order component) remain, whereby the extinction ratio cannot be infinite. Thus, the optical modulator (1) according to the first aspect of the present invention generates an electric signal ($3f_m$) which has a frequency three times of the frequency of the basic signal ($f_m$). And the phase adjusting part (18) adjusts phase difference between a phase of the basic signal ($f_m$) and that of the electric signal ($3f_m$). The basic signal ($f_m$) is outputted from the second signal source (high frequency signal source) (15). And the electric signal ($3f_m$), which has a frequency three times of the frequency of the basic signal ($f_m$), is outputted from the third harmonic signal source (17). The signal intensity adjusting part (19) adjusts the electric signal ($3f_m$). And the electric signal ($3f_m$) as a modulation signal is adjusted so that the first order component, which is generated by applying the modulation signal ($3f_m$), and the third order component, which is generated by applying the basic signal ($f_m$), have reversed phase and the same intensity level. This adjustment may be performed by manual operation while monitoring the output from the Mach-Zehnder waveguide. This adjustment may also be performed by the control part. The control part adjusts the phase and the timing of the output signal from the signal source part as needed, and applies a preferable signal to an electrode (especially, electrode C) while monitoring the output from the Mach-Zehnder waveguide. In this optical modulation system, a modulation signal with frequency ($f_m$) and a modulation signal with frequency ($3f_m$) are both applied to the electrode C.

FIGS. 4A to 4F is a conceptual diagram describing intensity and phase of the optical signals of the DSB-SC modulation system. FIG. 4A is a conceptual diagram showing an optical spectrum on the first arm. FIG. 4B is a conceptual diagram showing an optical spectrum on the second arm. FIG. 4C is a conceptual diagram showing an optical signal spectrum on the first arm which is provided with a phase shift of +90 degrees. FIG. 4D is a conceptual diagram showing an optical signal spectrum on the second arm which is provided with a phase shift of −90 degrees. FIG. 4E is a conceptual diagram showing a spectrum of an output signal generated by interference of optical signals from the first arm and the second arm at the combining part. FIG. 4F is a conceptual diagram showing suppression of a third order signal component by applying a $3f_m$ signal.

These optical signals, outputted from the first arm and the second arm, interferes with each other at the combining part. As a result, as shown in FIG. 4E, a carrier component ($f_0$) and a second order component ($f_0 \pm 2f_m$) are suppressed ideally, and USB component ($f_0 + f_m$) and LSB ($f_0 - f_m$) component remain. It is to be noted that the odd order component such as a third order component remains but the intensity is not as large as that of a first order component.

However, if a third order component remains, the extinction ratio cannot be improved. Therefore, in the present invention, as shown in FIG. 4F, a third harmonic signal which has frequency ($3f_m$) is also applied to the electrode C so that the third order component, generated from frequency ($f_m$), and the first order component, generated from frequency ($3f_m$), suppresses each other. This is realized by, as shown in FIG. 4F, adjusting output of the signal source so that the first order component, generated from frequency ($3f_m$), and the third order component, generated from frequency ($f_m$), have reversed phase and about the same level of intensity. As shown in FIG. 4F, since the first order component, generated from frequency ($3f_m$), and the third order component, generated from frequency ($f_m$), have reversed phase and about the same level of intensity, the third order component ($f_0+3f_m$) is effectively suppressed. Although the high order components such as a fifth order component, a seventh order component, and the like remain, intensities of these components are relatively minute and are not a substantial problem. But if the system of the present invention is applied to the high order components, these components can be effectively suppressed. For example, by applying high frequency signals, whose phase, intensity (amplitude) and the like of frequency $5f_m$ and $7f_m$ are adjusted, as modulation signals to the electrode C, these high order components can be effectively suppressed.

In reality, not only an odd order component but a carrier wave (a carrier signal) or a high order component (e.g. a second order component ($f_0 \pm 2f_m$)) of an optical signal are contained in signals. The optical modulation system according to the other aspect of the present invention suppresses at least one of these components.

The phases of carrier waves (carrier signals) and a high order component (e.g. a second order component ($f_0 \pm 2f_m$)) of optical signals outputted from each sub Mach-Zehnder waveguide are decided by phase or bias voltage of a signal applied to each sub Mach-Zehnder waveguide. Therefore, components to be suppressed are effectively suppressed by adjusting phases of output signals from each sub Mach-Zehnder waveguide, so that the phases of components to be suppressed (carrier waves (carrier signals) of optical signals or a high order component (e.g. a second order component ($f_0 \pm 2f_m$)) are reversed, before combined at the combining part.

The optical modulation system of the present invention comprises a substrate, waveguides formed on the substrate, electrodes, a signal source, a measuring part, a control part and the like. As a forming method of an optical waveguide, a publicly know forming method of the internal diffusion method such as the titanium diffusion method or a proton exchange method and the like can be used. In other words, the optical FSK modulator of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical modulator formed with titanium-diffused waveguide is manufactured.

The optical modulation system, for example, can be manufactured by the following process. A waveguide can be provided on the substrate surface of lithium niobate by proton exchange method or titanium thermal diffusion method. For example, Ti metal stripe (length of few μm) is formed in a row on an LN substrate by photolithographic technique. Subsequently, Ti metal is diffused into the substrate by exposing the LN substrate to heat (about 1000° C.). Through this process, a waveguide can be formed on an LN substrate.

Also, an electrode is manufactured in the same way as the above process. For example, in the same way as a formation of an optical waveguide, by using photolithography technique, an electrode can be formed on both sides of a plurality of waveguides which are formed in the same breadth, the electrode being formed so that the interelectrode gap is about 1 μm to 50 μm.

In case of manufacturing an electrode using silicon substrate, the manufacturing process, for example, is as follows. A lower cladding layer is disposed on a silicon (Si) substrate by the flame hydrolysis deposition method, the lower cladding layer being composed mostly of silicon dioxide ($SiO_2$). And then a core layer is deposed, the core layer being composed mostly of silicon dioxide ($SiO_2$) to which germanium dioxide ($GeO_2$) is added as a dopant. Subsequently, vitrification is performed in an electric furnace. And then, an optical waveguide is formed by etching and an upper cladding layer is disposed, the upper cladding layer being composed mostly of silicon dioxide ($SiO_2$). And then, a thin-film heater thermooptic intensity modulator and a thin-film heater thermooptic phase modulator are formed on the upper cladding layer.

FIG. 5 is a schematic block diagram showing an optical amplitude modulation system according to the second aspect of the present invention. As shown in FIG. 5, the optical amplitude modulation system according to the second aspect of the present invention is the optical amplitude modulation system in accordance with the claim 1, wherein the third electrode (electrode C) (13) further comprises: an electrode ($MZ_{CA}$ electrode) (21) which is provided along the first arm (4) between the first intensity modulator (9) and the combining part (6); and an electrode ($MZ_{CB}$ electrode) (22) which is provided along the second arm (5) between the second intensity modulator (10) and the combining part (6).

As shown in FIG. 5, since the optical amplitude modulation system comprises $MZ_{CA}$ electrode and the $MZ_{CB}$ electrode (in other words, comprises two main Mach-Zehnder electrodes (electrode C)), the optical modulation system can effectively suppress components to be suppressed by adjusting non-desired components (a carrier, a second order component, a third order component) to have reversed phase.

Hereinafter, the optical modulation system according to the second aspect of the present invention is described. Bias voltages are applied to the $DC_A$ electrode and the $DC_B$ electrode of the parallel aligned four optical modulators of the sub MZ waveguides so that the phase difference of the optical signals become 90 degrees respectively. These phase differences of the electric signals and the optical signals are adjusted as needed, but are basically adjusted to be an integral multiple of 90 degrees.

Ideally, an optical signal whose frequency is shifted by the frequency of the each RF signal is outputted from the sub mach-Zehnder. In reality, a carrier wave (carrier signal) or a high order component (e.g. a second order component ($f_0 \pm 2f_m$)) is contained in the optical signal. The optical modulation system of the present invention suppresses at least one of them.

In other words, the phases of carrier waves (carrier signals) and a high order component (e.g. a second order component ($f_0 \pm 2f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide so that the phases of components to be suppressed (carrier waves (carrier signals) of an optical signal or a high order component (e.g. a second order component ($f_0 \pm 2f_m$)) are reversed before combined at the combining part.

Figure 6:
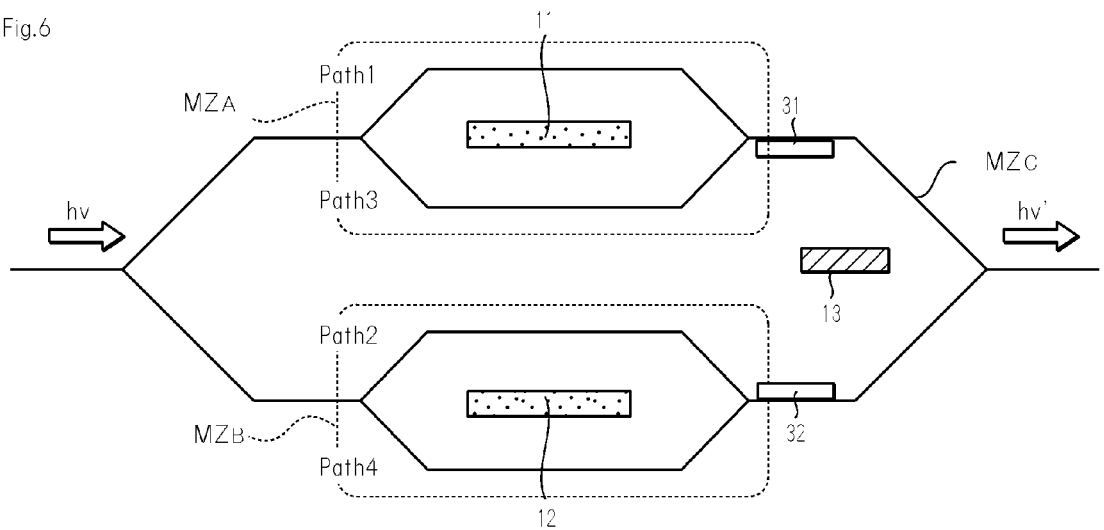
FIG. 6 is a schematic diagram showing a basic arrangement of an optical amplitude modulation system according to the third aspect of the present invention.

FIG. 6 is a schematic diagram showing a basic arrangement of an optical modulation system according to the third aspect of the present invention. As shown in FIG. 6, the optical modulation system according to the third aspect of the present invention relates to the above described optical amplitude modulation system which further comprises either one or both of an optical intensity compensation mechanism (31) and an optical intensity compensation mechanism (32), wherein the optical intensity compensation mechanism (31) is provided along the first arm (4) between the first intensity modulator (9) and the combining part (6), and the optical intensity compensation mechanism (32) is provided along the second arm (5) between the second intensity modulator (10) and the combing part (6).

As shown in FIG. 6, since the optical amplitude modulation system comprises the optical intensity compensation mechanisms (e.g. intensity modulators), the optical modulation system is able to adjust the intensities of components to be suppressed to the same level effectively. Therefore, by adjusting these components to have reversed phases, these components can be effectively suppressed. And, as far as the phase control is concerned, the optical modulation system according to the second aspect above explained may be adopted.

Figure 7:
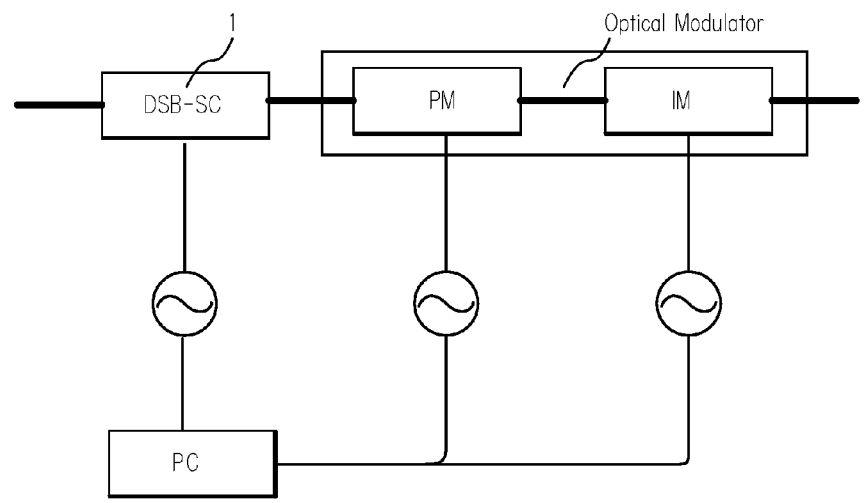
FIG. 7 is a schematic diagram showing a basic arrangement of an optical amplitude modulation system according to the fourth aspect of the present invention.

FIG. 7 is a schematic diagram showing a basic arrangement of an optical amplitude modulation system according to the fourth aspect of the present invention. As shown in FIG. 7, the optical amplitude modulation system according to the forth aspect of the present invention comprises: an above described optical amplitude modulation system as an optical amplitude modulator; either one or both of a phase modulator and an intensity modulator for modulating output light from the optical amplitude modulator or input light to the optical amplitude modulator; and a control part for controlling modulation time of a modulation signal of the optical amplitude modulator and a modulation signal of the phase modulator or the intensity modulator.

FIG. 7 shows an optical amplitude modulation system in which light is modulated first by the optical amplitude modulator and then by the phase modulator or the intensity modulator. But an optical modulation system in which light is modulated first by the phase modulator or the intensity modulator and then by the optical amplitude modulator performs as well. It is to be noted that, in FIG. 7, PM represents a phase modulator, and IM represents an intensity modulator. The phase modulator, for example, controls phase modulation amount of an optical signal which is modulated by applying an electric field to a waveguide. In specific, a waveguide and an electrode which is configured to apply an electric field to the waveguide is used.

The optical amplitude modulation system according to the fourth aspect of the present invention relates to, for example, an optical amplitude modulation system which comprises an optical amplitude modulator, and a phase and intensity modulator (specifically, two-electrode MZ-type modulator) which modulates output light from the optical amplitude modulator and input light to the optical amplitude modulator.

There remain unsuppressed carrier components in the output of the optical amplitude modulator such as an optical DSB-SC modulator. These unsuppressed carrier components prevent extinction ratio from improving. However, a high extinction ratio modulation can be realized by performing a phase modulation and/or an intensity modulation to the output light from the optical amplitude modulator, or by performing a modulation to an input light to the optical amplitude modulator so that the unsuppressed components are suppressed. In this process, phase and timing of sidebands offset form the first sidebands (whose frequency is equal to that of a carrier or a high order component) are adjusted so that carrier components (or high order components) are canceled. Thus, carrier components (or high order components)

can be suppressed, thereby realizing an optical amplitude modulation system which can perform high extinction ratio modulation.

A preferable embodiment of the optical amplitude modulation system according to the fourth aspect of the present invention is as follows.

The optical amplitude modulator outputs double side band signals. Then, the phase modulator or the intensity modulator modulates either one or both of the double side band signals, and the other double side band signals are generated. The control part controls so that a frequency of either one of the double side band signals become equal to a frequency of an optical carrier signal or a high order optical signal of output light from the optical amplitude modulator, and the optical carrier signal or the high order optical signal is cancelled.

The other preferable embodiment of the optical amplitude modulation system according to the fourth aspect of the present invention is as follows.

The phase modulator or the intensity modulator modulates outputs double side band signals. Then, the optical amplitude modulator modulates the double side band signals, and the other double side band signals are generated. The control part controls so that a frequency of either one of the double side band signals become equal to a frequency of an optical carrier signal or a high order optical signal of output light from the optical amplitude modulator, and the optical carrier signal or the high order optical signal is cancelled.

Hereinafter, spectrum of the optical signal of the optical amplitude modulation system according to the fourth aspect of the present invention is described. It is to be noted that the phase modulator (PM) and the intensity modulator (IM), as optical modulators, are connected to the optical modulation system in this order.

Figure 8:
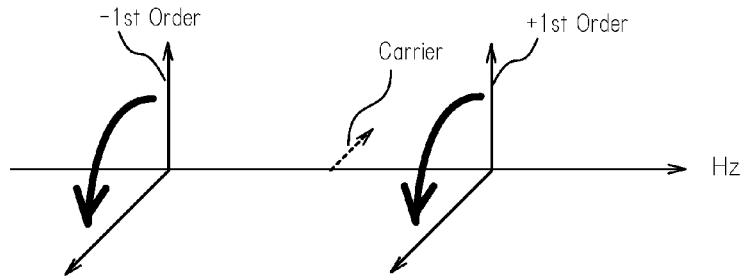
FIG. 8 is a schematic diagram showing an example of a modulation signal outputted from the phase modulator of the optical modulation system according to the fourth aspect of the present invention.

FIG. 8 is a schematic diagram showing an example of a modulation signal outputted from the phase modulator of the optical amplitude modulation system according to the fourth aspect of the present invention. This example shows suppression of the carrier signal components by using side band signals offset from the side band signals of the first order component. As shown in FIG. 8, the modulation signal outputted from the phase modulator has side band signals (+first order, −first order), a carrier signal, and a high order component signal not shown in figures. And optical phases of one or more than two of the side band signals (+first order, −first order), the carrier signal, or the high order component signal are modulated. In FIG. 8, a phase of the first order component is modulated.

In particular, the phase modulator grasps an optical signal to be suppressed (a carrier signal or a high order component signal). The phase modulator also grasps phases of side band signals, modulated by the intensity modulator, which is used to suppress the optical signal to be suppressed. And the phase modulator controls these signals so that the phases of these signals, after being modulated by the optical modulator, are reversed. In the example of the FIG. 8, a phase of the unsuppressed carrier signal component and a phase of the side band signal are originally shifted by $\pi/2$. Therefore, the phase modulator, having received an order from the control part, controls voltage applied to the electrode so that the phases of the side band signals are shifted further by $\pi/2$. Thus, the phase of the carrier signal component and the phase of the side band signal are shifted by $\pi$ (in other words, the phases are reversed).

Figure 9:
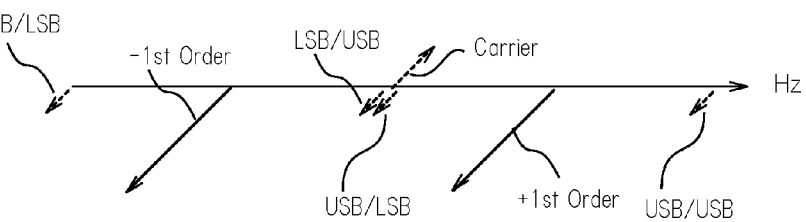
FIG. 9 is a schematic diagram explaining a modulation signal outputted from an intensity modulator.

FIG. 9 is a schematic diagram explaining a modulation signal outputted from the intensity modulator. FIG. 10 is a schematic diagram showing a modulation signal outputted from the intensity modulator. As shown in FIG. 9, the modulation signal which is outputted from the intensity modulator has the side band signals which suppress the optical signal (a carrier signal or a high order component signal). The side band signals and the optical signal to be suppressed (a carrier signal or a high order component signal) have the same frequency level and mutually reversed phases. In FIG. 9, a carrier signal and an USB signal of an LSB signal or an LSB signal of an USB signal have reversed phases. Therefore, as shown in FIG. 10, the modulation signal outputted from the intensity modulator lowers (ideally suppresses) the intensity of a signal to be suppressed.

FIGS. 11A and 11B are diagram explaining the optical amplitude modulation system according to the fifth aspect of the present invention. FIG. 11A shows a preferable embodiment of the optical amplitude modulation system according to the fifth aspect of the present invention. FIG. 11B shows the other embodiment of the optical amplitude modulation system according to the fifth aspect of the present invention. As shown in FIG. 11A and FIG. 11B, the optical amplitude modulation system according to the fifth aspect of the present invention is the above described optical amplitude modulation system comprising: a circulator (42) wherein the optical signal which have been combined at the combining part is inputted; and a fiber grating wherein an output light from the circulator is inputted.

In particular, it is the optical amplitude modulation system comprising the above described optical amplitude modulation system which acts as an optical modulator, a circulator, a fiber grating, a photodetector, and a control part. An output signal from the optical modulator is inputted to the circulator. An output light from the circulator is inputted to the fiber grating which reflects predetermined optical signal components of the optical modulator and transmits the other optical signal components. The photodetector detects the optical signal which has transmitted through the fiber grating. The control part controls a signal based on the optical signal detected by the photodetector. The signal is outputted from the signal source which applies a signal to the optical modulator. The optical amplitude modulation system of this embodiment is preferable because unnecessary components are removed by the fiber grating and the circulator, and the removed components can be used as feed back signals.

In particular, the fiber grating (43), for example, is configured to reflect only components which are wanted as output components. A necessary component (e.g. a $(f_0 \pm f_m)$ component) of the optical signal, which is inputted to the fiber grating (43) from the circulator (42), is reflected by the fiber grating and inputted to the circulator (42). And the optical signal, which is inputted to the circulator via the fiber grating, is transmitted to the output part, not the combining part. On the other hand, optical signals transmitted trough the fiber grating are not necessary components. Therefore, these components are removed by the fiber grating, thereby generating optical signals with ideal spectra.

On the other hand, a preferable embodiment of the present invention is an optical amplitude modulation system, wherein the photodetector (44) detects the optical signal which is removed by the fiber grating, the detected signal is transmitted to the control part (23), and a signal of the signal source system (16) is controlled so that the components other than necessary components (e.g. a $(f_0 \pm f_m)$ component) are decreased.

Specifically, the optical amplitude modulation system of this embodiment, used with the optical amplitude modulation system according to the sixth aspect of the present invention, is able to decrease the components other than necessary components by adjusting voltage level applied to various signal sources.

The optical amplitude modulation system according to the fifth aspect of the present invention is preferably a DSB-SC modulation system. In the optical amplitude modulation system of this embodiment, for example, the optical frequency which is reflected by the fiber grating is set to be $(f_0 \pm f_m)$. It is also set so that $(f_0+f_m)$ or $(f_0-f_m)$ is reflected. In this case, the optical amplitude modulation system can be used as an SSB modulation system.

As shown in FIG. 11B, the optical amplitude modulation system according to the fifth aspect of the present invention may be configured so that necessary components transmit the fiber grating. In this case, unnecessary components are reflected by the fiber grating and decreased. It is also possible for the control part to control the signal source so that unnecessary components are decreased in the same way as the above explanation by detecting the unnecessary components by the circulator.

A uniform fiber grating, a chirp grating, or a multisection grating are, for example, used as the fiber grating (FBG). Also, the fiber grating may be capable of providing modulation. Hereinafter, the FBG is explained. The FBG can be obtained, for example, by radiating ultraviolet rays through a phase mask to change the core refractive index by a predetermined pitch.

A uniform FBG is an FBG whose grating has a cycle, refractive index and the like that are uniform. It is to be noted that for a pitch of a grating, an appropriate interval corresponding to a wavelength of a subject light can be used. For example, 100 nm to 1000 nm can be used, while 300 nm to 800 nm is acceptable. Also, as a refractive index difference, $1 \times 10^{-6}$ to $1 \times 10^{-2}$ can be used, while $1 \times 10^{-5}$ to $5 \times 10^{-3}$ and $1 \times 10^{-4}$ to $1 \times 10^{-3}$ are acceptable.

A chirp grating has a refractive index cycle and grating cycle changed in a longitudinal direction of the FBG. It is to be noted that while usually the pitches of the grating of the chirped FBG are gradually changed, one with appropriate intervals may be used according to the wavelength of the subject light. For example, 100 nm to 1000 nm can be used, while 300 nm to 800 nm is acceptable. Also, as the difference of refractive index of the grating against the core, $1 \times 10^{-6}$ to $1 \times 10^{-2}$ can be mentioned, while $1 \times 10^{-5}$ to $5 \times 10^{-3}$ and $1 \times 10^{-4}$ to $1 \times 10^{-3}$ are acceptable.

A multi-section FBG is an FBG in which changes in wavelengths and changes in reflection points are discrete. Namely, while optical signals with wavelength components within a certain range are reflected at a same reflection point, reflection points change discretely for wavelength components in a different range. It is to be noted that while the pitches of the grating of the multi-section FBG are usually adjusted according to a purpose, pitches of appropriate intervals according to the wavelength of the subject light may be used. For example, 100 nm to 1000 nm can be used, while 300 nm to 800 nm is acceptable. Also, as the difference of refraction index of the grating against the core, $1 \times 10^{-6}$ to $1 \times 10^{-2}$ can be used, while $1 \times 10^{-5}$ to $5 \times 10^{-3}$ and $1 \times 10^{-4}$ to $1 \times 10^{-3}$ are acceptable.

The optical amplitude modulation system according to the sixth aspect of the present invention is the optical amplitude modulation system above described which further comprises a control part. The control part is connected to a detecting part of an output signal from the Mach-Zehnder waveguide (8), and outputs a control signal which controls voltage applied to each electrode to a signal source. The control part (i) adjusts voltage applied to the first electrode (electrode A) (11), the second electrode (electrode B) (12) and the third electrode (electrode C) (13) so as to increase output from the Mach-Zehnder waveguide (8), (ii) adjusts bias voltage applied to the third electrode (electrode C) (13) so as to decrease output from the Mach-Zehnder waveguide (8), (iii) decreases bias voltage of either one of the sub Mach-Zehnder electrodes so as to decrease output from the Mach-Zehnder waveguide (8), and (iv) adjusts bias voltage applied to the third electrode (electrode C) (13) so as to decrease output from the Mach-Zehnder waveguide (8).

The optical amplitude modulation system according to the sixth aspect of the present invention is preferably and automatically capable of obtaining a preferable bias voltage level by a bias modulation method including the steps of:

(i) adjusting voltage applied to the first electrode (electrode A) (11), the second electrode (electrode B) (12) and the third electrode (electrode C) (13) so as to increase output from the Mach-Zehnder waveguide (8), (ii) adjusting bias voltage applied to the third electrode (electrode C) (13) so as to decrease output from the Mach-Zehnder waveguide (8), (iii) decreasing bias voltage of either one of the sub Mach-Zehnder electrodes so as to decrease output from the Mach-Zehnder waveguide (8), and (iv) adjusting bias voltage applied to the third electrode (electrode C) (13) so as to decrease output from the Mach-Zehnder waveguide (8).

By using the bias voltage adjusted in this way, in other words, by using a signal with relatively less carrier components or relatively less high order components, these components are suppressed by the method above explained. Therefore, the components to be suppressed can be suppressed more effectively.

The extinction ratio modulation method of a preferable embodiment of the present invention is explained below. The modulation method of the present invention basically includes the steps of:

(i) adjusting bias voltage of the main Mach-Zehnder electrode (electrode C) and bias voltage of the two sub Mach-Zehnder electrodes so as to increase output from the main Mach-Zehnder waveguide;

(ii) adjusting bias voltage of the electrode C so as to decrease output from the main Mach-Zehnder waveguide;

(iii) decreasing bias voltage of either one of the sub Mach-Zehnder electrodes so as to decrease output from the main Mach-Zehnder waveguide; and (iv) adjusting bias of the electrode C so as to decrease output from the main Mach-Zehnder waveguide.

It is to be noted that repeatedly performing the above step (iii) and the step (iv) is a preferable embodiment of the present invention. Hereinafter, each step is explained.

(i) Step of adjusting bias voltage of the electrode C and bias voltage of the two sub Mach-Zehnder electrodes so as to increase output from the main Mach-Zehnder waveguide.

This step adjusts bias voltage of the electrode C and bias voltage of two sub Mach-Zehnder electrodes so that output from the main Mach-Zehnder waveguide is increased (preferably as much as possible, more preferably maximized). Since the main MZ waveguide is, for example, connected to a measurement system, the bias voltage applied to the each Mach-Zehnder electrode may be adjusted by observing output levels of the measurement system.

The measurement system may be connected to a power supply system supplying each bias voltage via a control device, and each bias voltage may be controlled so that optical intensity measured by the measurement system is increased.

The control device comprises an input part, an output part, a memory part (including memory and main memory), a computing part. The input part inputs information. The output part outputs information. The memory part stores information. And the computing part such as CPU performs arithmetic operations. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from a controlling program of the main memory, outputs a signal changing bias voltages applied to either one of or two or more of electrodes from the output part. This process changes the intensity level of output light. The control device, retrieving the information and comparing it to the former optical intensity, outputs an order of changing bias voltages so as to increase the optical intensity from the output part. A power source which received this output signal, based on the order, changes voltage levels applied to each electrode, thereby increasing the optical output.

(ii) Step of adjusting bias voltage of electrode C so as to decrease output from the main Mach-Zehnder waveguide.

This step adjusts bias voltage applied to the main Mach-Zehnder electrode so that intensity of output light from the main Mach-Zehnder waveguide is decreased. Since the main MZ waveguide is connected to a measurement system not shown in figures, the bias voltage applied to the main Mach-Zehnder electrode may be adjusted by observing output levels of the measurement system.

The measurement system may be connected to a power supply system supplying bias voltage to the main Mach-Zehnder electrode via a control device, and the bias voltage may be controlled so that optical intensity measured by the measurement system is decreased. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from the controlling program of the main memory, outputs a signal changing bias voltages applied to the main Mach-Zehnder electrode from the output part. This process changes the intensity level of output light. The control device, retrieving the information and comparing it to the former optical intensity, outputs an order of changing bias voltages so as to decrease the optical intensity from the output part. A power source which received this output signal, based on the order, changes voltage levels applied to the main Mach-Zehnder electrode, thereby decreasing the optical output.

(iii) Step of decreasing bias voltage of either one of the sub Mach-Zehnder electrodes so as to decrease output from the main Mach-Zehnder waveguide.

In this step, bias voltage of either one of the sub Mach-Zehnder electrodes is decreased so that output from the main Mach-Zehnder waveguide is decreased. In this step, if bias voltage of either one of the sub Mach-Zehnder electrodes is decreased, output from the main Mach-Zehnder waveguide will be decreased. Therefore, bias voltage of the sub Mach-Zehnder electrode, to which output from the main Mach-Zehnder waveguide is decreased, is adjusted to be decreased. In this step, voltage level to be increased or decreased may be predetermined. A range of voltage level change is, for example, from 0.01V to 0.5V, and is preferably from 0.05V to 0.1V. By this step, output intensity from the main Mach-Zehnder is decreased. Since the main Mach-Zehnder waveguide is connected to a measurement system not shown in figures, the bias voltage may be adjusted by observing output levels of the measurement system.

The measurement system may be connected to a power supply system supplying bias voltage to the electrode A and the electrode B via a control device, and the bias voltage applied to the electrode A or the electrode B may be controlled. In this case, information on an electrode whose voltage level is changed and information on voltage level to be changed may be stored in a memory and the like. The CPU of the control device, based on an order from a controlling program of the main memory, retrieves control information from the memory, and outputs a signal changing bias voltage applied to the electrode A and electrode B. This changes bias voltage applied to the electrode A or the electrode B by a certain amount. And if the bias voltage applied to the electrode A or the electrode B changes by a certain amount, intensity of an optical signal from the main Mach-Zehnder will be changed. The information on optical intensity observed by the measurement system is inputted from the input part and stored in the memory. The CPU of the control device, based on an order from the controlling program of the main memory, retrieves information on optical intensity stored in the memory, outputs an order from the output part. The order is to change bias voltages applied to the sub Mach-Zehnder electrodes so as to decrease optical intensity from the main Mach-Zehnder waveguide. The power source, having received this output signal, changes the voltage level applied to electrodes based on the order, thereby decreasing optical output.

(iv) Step of adjusting bias voltage of the electrode C so as to decrease output of the main Mach-Zehnder waveguide.

This step adjusts bias voltage of electrode C so as to decrease output of the main Mach-Zehnder waveguide. Since the main MZ waveguide is connected to a measurement system not shown in figures, for example, the bias voltage may be adjusted by observing output levels of the measurement system. It is to be noted that this step or the above step (iii) and this step may be repeatedly performed.

The measurement system may be connected to a power supply system supplying bias voltage to the electrode C via a control device, and bias voltage applied to the electrode C may be controlled. The CPU of the control device, based on an order from a controlling program of the main memory, retrieves control information from the memory, and outputs a signal changing bias voltage applied to the electrode C from output part. This changes bias voltage applied to the electrode C by a certain amount.

Also, the CPU of the control device, based on an order from a controlling program of the main memory, retrieves control information or information on output light from the memory, and may make a decision to stop adjusting bias voltage. To the contrary, the CPU may keep adjusting bias voltage by feeding back intensity information of an output light from the measurement system.

The optical modulation system according to the seventh embodiment of the present invention comprises: an optical modulator; a circulator (42); a fiber grating (43); a photodetector (44); and a control part (23). An output signal from the optical modulator is inputted to the circulator (42). An output light from the circulator is inputted to the fiber grating (43) which reflects predetermined optical signal components of the optical modulator and transmits the other optical signal components. The photodetector (44) detects the optical signal which has transmitted through the fiber grating. The control part (23), based on the optical signal detected by the photodetector, controls a signal applied to the optical modulator which is outputted from the signal source (16). The optical amplitude modulation system of this embodiment, the same way as the optical amplitude modulation system according to the fifth embodiment of the present invention, effectively extracts a predetermined optical signal, and, by separating unnecessary optical signal components, controls the signal source system so that the intensity of the unnecessary optical signal components are weakened, thereby decreasing the unnecessary components more effectively.

The optical modulation system according to the seventh aspect of the present invention is the above described optical modulation system which preferably comprises: a Mach-Zehnder waveguide (8) including an input part (2) of an optical signal, a branching part (3) where the optical signal is branched, a first arm (4) which is configured to act as a waveguide, wherein one of the optical signal branched from the branching part (3) propagates though the first arm, a second arm (5) which is configured to act as a waveguide, wherein the remaining optical signal branched from the branching part (3) propagates though the second arm, a combining part (6) which combines the optical signals outputted from the first arm (4) and the second arm (5), and an output part (7) which outputs the optical signal being combined at the combining part (6); a first intensity modulator (9) provided on the first arm (4) wherein the first intensity modulator (9) controls amplitude of the optical signal propagating through the first arm (4); a second intensity modulator (10) provided on the second arm (5) wherein the second intensity modulator (10) controls amplitude of the optical signal propagating through the second arm (5); a first electrode (electrode A) (11) of the first intensity modulator (9); a second electrode (electrode B) (12) of the second intensity modulator (10); a third electrode (electrode C) (13) which controls a phase difference between the optical signals propagating through the first arm (4) and the second arm (5), and to which a modulation signal is applied; and a signal source part (16) which includes a first signal source (14) and a second signal source (high frequency signal source) (15), wherein the first signal source (14) is for supplying bias voltage applied to the first electrode (electrode A) (11), the second electrode (electrode B) (12), and the third electrode (electrode C) (13), and wherein the second signal source (high frequency signal source) (15) is for supplying a radio frequency signal to the third electrode (electrode C) (13).

Operation and structure of the optical modulation system according to the seventh aspect of the present invention are the same as those of the optical amplitude modulation system according to the fifth aspect of the present invention.

The optical modulation method by the optical modulator of the present invention is able to realize high extinction ratio. Therefore the optical modulation method can effectively be used in the field of optical information communication.

What is claimed is:

1. An optical amplitude modulation system comprising:
   a Mach-Zehnder waveguide, the Mach-Zehnder waveguide comprising:
      an input part of an optical signal;
      a branching part where the optical signal is branched;
      a first arm, the first arm being configured to act as a waveguide; wherein one of the optical signal branched from the branching part propagates though the first arm;
      a second arm, the second arm being configured to act as a waveguide, wherein the remaining optical signal branched from the branching part propagates though the second arm;
      a combining part combining the optical signals, the optical signals outputted from the first arm and the second arm; and
      an output part outputting the optical signal, the optical signal being combined at the combining part;
   a first intensity modulator provided on the first arm, the first intensity modulator controlling amplitude of the optical signal propagating through the first arm;
   a second intensity modulator provided on the second arm, the second intensity modulator controlling amplitude of the optical signal propagating through the second arm;
   a first electrode (electrode A) of the first intensity modulator;
   a second electrode (electrode B) of the second intensity modulator;
   a third electrode (electrode C) controlling a phase difference between the optical signal propagating through the first arm and the optical signal propagating through the second arm, a modulation signal being applied to the third electrode; and
   a signal source part, the signal source part comprising:
      a first signal source for supplying bias voltage, the bias voltage being applied to the first electrode (electrode A), the second electrode (electrode B), and the third electrode (electrode C); and
      a second signal source, which is a high frequency signal source, for supplying a radio frequency signal to the third electrode (electrode C),
      wherein the second signal source comprises:
         a third harmonic signal generator for generating an electric signal ($3f_m$), the electric signal ($3f_m$) having a frequency three times the frequency of a basic signal ($f_m$);
         a phase adjusting part for adjusting a phase difference between a phase of the basic signal ($f_m$) and a phase of the electric signal ($3f_m$), the basic signal ($f_m$) being outputted from the second signal source, the electric signal ($3f_m$) being outputted from the third harmonic signal generator, the electric signal ($3f_m$) having a frequency three times the frequency of the basic signal ($f_m$); and
         a signal intensity adjusting part for adjusting intensity of the basic signal ($f_m$) or the electric signal ($3f_m$), the basic signal ($f_m$) being outputted from the second signal source, the electric signal ($3f_m$) being generated from the third harmonic signal generator, the electric signal ($3f_m$) having a frequency three times the frequency of the basic signal ($f_m$).

2. The optical amplitude modulation system as claimed in claim 1,
   wherein the first intensity modulator is a first sub Mach-Zehnder electrode having the first electrode (electrode A), and
   wherein the second intensity modulator is a second sub Mach-Zehnder electrode having the second electrode (electrode B).

3. The optical amplitude modulation system as claimed in claim 1,
   wherein the third electrode (electrode C) further comprises:
      an electrode ($MZ_{CA}$ electrode) provided along the first arm between the first intensity modulator and the combining part; and
      an electrode ($MZ_{CB}$ electrode) provided along the second arm between the second intensity modulator and the combining part.

4. The optical amplitude modulation system as claimed in claim 3, further comprising:
   a control part for adjusting voltage applied to the $MZ_{CA}$ electrode and the $MZ_{CB}$ electrode, the voltage being adjusted so that phase difference between phases of optical carrier signals become 180 degrees, or phase difference between phases of second order optical signals become 180 degrees, the optical carrier signals and the second order optical signals being contained in output signals from the first arm and output signals from the second arm.

5. The optical amplitude modulation system as claimed in claim 1, farther comprising:
   either one or both of an optical intensity compensation mechanism and an optical intensity compensation mechanism, the optical intensity compensation mechanism being provided along the first arm between the first intensity modulator and the combining part, the optical intensity compensation mechanism being provided along the second arm between the second intensity modulator and the combing part.

6. The optical amplitude modulation system as claimed in claim 1, further comprising:
   either one or both of a phase modulator and an intensity modulator for modulating output light from the output part of the Mach-Zehnder waveguide or input light to the input part of the Mach-Zehnder waveguide and
   a control part for adjusting modulation time of a modulation signal of the optical amplitude modulator and a modulation signal of the phase modulator or the intensity modulator.

7. The optical amplitude modulation system as claimed in claim 6,
   wherein the control part controls that the phase modulator or the intensity modulator modulates either one or both of double side band signals of an output signal from the optical amplitude modulator or an input light to the optical amplitude modulator so that a frequency of either one of the double side band signals outputted from the optical amplitude modulator becomes equal to a frequency of an optical carrier signal or a high order optical signal of output light from the optical amplitude modulator, thereby the optical carrier signal or the high order optical signal being cancelled.

8. The optical amplitude modulation system as claimed in claim 1, further comprising:
   a circulator wherein the optical signal is inputted, the optical signal having been combined at the combining part; and
   a fiber grating wherein output light from the circulator is inputted.

9. The optical amplitude modulation system as claimed in claim 1,
   wherein the optical amplitude modulation system is an optical carrier suppressed double side band (DSB-SC) modulation system.

10. The optical amplitude modulation system as claimed in claim 1, further comprising:
    a control part being connected to a detecting part of an output signal from the Mach-Zehnder waveguide, the control part outputting a control signal to a signal source, the control signal controlling voltage applied to each electrode,
    wherein the control part
    (i) adjusts voltage applied to the first electrode (electrode A), the second electrode (electrode B), and the third electrode (electrode C) so as to increase output from the Mach-Zehnder waveguide,
    (ii) adjusts bias voltage applied to the third electrode (electrode C) so as to decrease output from the Mach-Zehnder waveguide,
    (iii) decreases bias voltage of either one of the sub Mach-Zehnder electrodes so as to decrease output from the Mach-Zehnder waveguide, and
    (iv) adjusts bias voltage applied to the third electrode (electrode C) so as to decrease output from the Mach-Zehnder waveguide.

11. The optical amplitude modulation system as claimed in claim 10,
    wherein the optical amplitude modulation system is an optical carrier suppressed double side band (DSB-SC) modulation system.

12. A bias adjustment method of the optical amplitude modulation system as claimed in claim 1, the method comprising the steps of:
    (i) adjusting voltage applied to the first electrode (electrode A), the second electrode (electrode B), and the third electrode (electrode C) so as to increase output from the Mach- Zehnder waveguide;
    (ii) adjusting bias voltage applied to the third electrode (electrode C) so as to decrease output from the Mach-Zehnder waveguide;
    (iii) decreasing bias voltage of either one of the sub Mach-Zehnder electrodes so as to decrease output from the Mach-Zehnder waveguide; and
    (iv) adjusting bias voltage applied to the third electrode (electrode C) so as to decrease output from the Mach-Zehnder waveguide.

13. An optical modulation system comprising:
    an optical modulator;
    a circulator wherein an output signal from the optical modulator is inputted;
    a fiber grating wherein output light from the circulator is inputted, the fiber grating reflecting predetermined optical signal components outputted from the optical modulator, the fiber grating transmitting the other optical signal components;
    a photodetector detecting the optical signal, the optical signal having transmitted through the fiber grating; and
    a control part controlling a signal based on the optical signal detected by the photodetector, the signal being outputted from a signal source, the signal source applying a signal to the optical modulator.

14. The optical modulation system as claimed in claim 13 further comprising:
    a Mach-Zehnder waveguide including
      an input part of an optical signal,
      a branching part where the optical signal is branched,
      a first arm, the first arm being configured to act as a waveguide, wherein one of the optical signal branched from the branching part propagates though the first arm,
      a second arm, the second arm being configured to act as a waveguide, wherein the remaining optical signal branched from the branching part propagates though the second arm,
      a combining part combining the optical signals, the optical signals outputted from the first arm and the second arm, and
      an output part outputting the optical signal, the optical signal being combined at the combining part;

a first intensity modulator provided on the first arm, the first intensity modulator controlling amplitude of the optical signal propagating through the first arm;

a second intensity modulator provided on the second arm, the second intensity modulator controlling amplitude of the optical signal propagating through the second arm;

a first electrode (electrode A) of the first intensity modulator;

a second electrode (electrode B) of the second intensity modulator;

a third electrode (electrode C) controlling a phase difference between the optical signal propagating through the first arm and the optical signal propagating through the second arm, a modulation signal being applied to the third electrode; and a signal source part including a first signal source for supplying bias voltage, the bias voltage being applied to the first electrode (electrode A), the second electrode (electrode B), and the third electrode (electrode C), and a second signal source, which is a high frequency signal source, for supplying a radio frequency signal to the third electrode (electrode C).

* * * * *